(12) United States Patent
Ardelean et al.

(10) Patent No.: US 11,170,240 B2
(45) Date of Patent: Nov. 9, 2021

(54) INTERACTION SYSTEM AND METHOD (71) Applicant: Cerence Operating Company, Burlington, MA (US)

(72) Inventors: Christian Ardelean, Montreal (CA); Michael Kaisser, Stuttgart (DE); Johan Wouters, Oberwil-Lieli (CH); Robert M. Policano, Bloomfield, NJ (US); Nils Lenke, Rheinbach (DE); Binh Dac Nguyen, Saint Laurent (CA)

(73) Assignee: Cerence Operating Company, Burlington, MA (US)

(*) Notice: Subject to any disclaimer, the term of this patent is extended or adjusted under 35 U.S.C. 154(b) by 0 days.

(21) Appl. No.: 16/405,737

(22) Filed: May 7, 2019

(65) Prior Publication Data

US 2020/0218914 A1 Jul. 9, 2020

Related U.S. Application Data

(60) Provisional application No. 62/788,401, filed on Jan. 4, 2019.

(51) Int. Cl.
*G06K 9/00* (2006.01)
*B60W 40/08* (2012.01)
*B60W 50/14* (2020.01)

(52) U.S. Cl.
CPC ......... *G06K 9/00845* (2013.01); *B60W 40/08* (2013.01); *B60W 50/14* (2013.01); *G06K 9/00838* (2013.01); *B60W 2040/0872* (2013.01); *B60W 2050/143* (2013.01); *B60W 2050/146* (2013.01); *B60W 2540/21* (2020.02); *B60W 2710/246* (2013.01)

(58) Field of Classification Search
None
See application file for complete search history.

(56) References Cited

U.S. PATENT DOCUMENTS

| | | | | |
|---|---|---|---|---|
| 4,352,089 | A * | 9/1982 | Yano | B60R 16/0373 340/460 |
| 5,602,425 | A * | 2/1997 | Wilhelmi | B60N 2/0276 180/271 |
| 9,751,534 | B2 * | 9/2017 | Fung | G16H 50/20 |
| 9,998,697 | B2 * | 6/2018 | Frank | G06K 9/00362 |
| 2015/0283914 | A1 * | 10/2015 | Malone | B60J 7/0573 701/49 |
| 2016/0191859 | A1 | 6/2016 | Lisseman | |
| 2018/0047201 | A1 * | 2/2018 | Filev | G01C 21/3608 |
| 2019/0065873 | A1 * | 2/2019 | Wang | B60W 50/14 |

* cited by examiner

*Primary Examiner* — Adolf Dsouza
(74) *Attorney, Agent, or Firm* — Occhiuti & Rohlicek LLP (57) ABSTRACT

A method, computer program product, and computing system for monitoring an interior environment of a motor vehicle; determining a personal state of an occupant within the interior environment of the motor vehicle; and interacting with the occupant based, at least in part, upon the personal state of the occupant.

23 Claims, 3 Drawing Sheets

INTERACTION SYSTEM AND METHOD

RELATED APPLICATION(S)

This application claims the benefit of U.S. Provisional Application No. 62/788,401, filed on 4 Jan. 2019, the entire contents of which is herein incorporated by reference.

TECHNICAL FIELD

This disclosure relates to interaction systems and, more particularly, to interaction systems for use within motor vehicles.

BACKGROUND

The capabilities of today's consumer electronic devices are continuously expanding. And when these consumer electronic devices are coupled with systems that capture audio (such as microphones) and systems that capture video (such as cameras), these consumer electronic devices may allow a user to e.g., use their voice, face, and/or eyes as a "password" that grants them access to such consumer electronic devices.

Further and through the use of such supplemental information obtained via e.g., microphones and cameras, the manner in which such consumer electronic devices function may be altered/manipulated depending upon what these consumer electronic devices "hear" and "see".

SUMMARY OF DISCLOSURE

In one implementation, a computer-implemented method is executed on a computing device and includes: monitoring an interior environment of a motor vehicle; determining a personal state of an occupant within the interior environment of the motor vehicle; and interacting with the occupant based, at least in part, upon the personal state of the occupant.

One or more of the following features may be included. The occupant may be a driver of the motor vehicle. The personal state of the occupant within the interior environment of the motor vehicle may include one or more of: a physiological/physical/external state of the occupant within the interior environment of the motor vehicle; and a mental/emotional/internal state of the occupant within the interior environment of the motor vehicle. Interacting with the occupant based, at least in part, upon the personal state of the occupant may include physically altering the interior environment of the motor vehicle. Physically altering the interior environment of the motor vehicle may include one or more of: adjusting a temperature of the interior environment of the motor vehicle; adjusting one or more windows of the motor vehicle; adjusting a moon roof of the motor vehicle; adjusting one or more interior lights of the motor vehicle; adjusting an entertainment system of the motor vehicle; adjusting a seating system of the motor vehicle; and adjusting a ventilation system of the motor vehicle. Interacting with the occupant based, at least in part, upon the personal state of the occupant may include one or more of: triggering an audible alarm; triggering a visual alarm; physically engaging the occupant within the interior environment of the motor vehicle; visually engaging the occupant within the interior environment of the motor vehicle; and audibly engaging the occupant within the interior environment of the motor vehicle. Interacting with the occupant based, at least in part, upon the personal state of the occupant may include adjusting the manner in which a speech-based communication system engages the occupant within the interior environment of the motor vehicle. Adjusting the manner in which a speech-based communication system engages the occupant within the interior environment of the motor vehicle may include one or more of: adjusting the tempo of words used by the speech-based communication system to engage the occupant within the interior environment of the motor vehicle; adjusting the vocabulary of words used by the speech-based communication system to engage the occupant within the interior environment of the motor vehicle; adjusting the quantity of words used by the speech-based communication system to engage the occupant within the interior environment of the motor vehicle; adjusting the inflection of words used by the speech-based communication system to engage the occupant within the interior environment of the motor vehicle; and adjusting the timbre of words used by the speech-based communication system to engage the occupant within the interior environment of the motor vehicle.

In another implementation, a computer program product resides on a computer readable medium and has a plurality of instructions stored on it. When executed by a processor, the instructions cause the processor to perform operations including monitoring an interior environment of a motor vehicle; determining a personal state of an occupant within the interior environment of the motor vehicle; and interacting with the occupant based, at least in part, upon the personal state of the occupant.

One or more of the following features may be included. The occupant may be a driver of the motor vehicle. The personal state of the occupant within the interior environment of the motor vehicle may include one or more of: a physiological/physical/external state of the occupant within the interior environment of the motor vehicle; and a mental/emotional/internal state of the occupant within the interior environment of the motor vehicle. Interacting with the occupant based, at least in part, upon the personal state of the occupant may include physically altering the interior environment of the motor vehicle. Physically altering the interior environment of the motor vehicle may include one or more of: adjusting a temperature of the interior environment of the motor vehicle; adjusting one or more windows of the motor vehicle; adjusting a moon roof of the motor vehicle; adjusting one or more interior lights of the motor vehicle; adjusting an entertainment system of the motor vehicle; adjusting a seating system of the motor vehicle; and adjusting a ventilation system of the motor vehicle. Interacting with the occupant based, at least in part, upon the personal state of the occupant may include one or more of: triggering an audible alarm; triggering a visual alarm; physically engaging the occupant within the interior environment of the motor vehicle; visually engaging the occupant within the interior environment of the motor vehicle; and audibly engaging the occupant within the interior environment of the motor vehicle. Interacting with the occupant based, at least in part, upon the personal state of the occupant may include adjusting the manner in which a speech-based communication system engages the occupant within the interior environment of the motor vehicle. Adjusting the manner in which a speech-based communication system engages the occupant within the interior environment of the motor vehicle may include one or more of: adjusting the tempo of words used by the speech-based communication system to engage the occupant within the interior environment of the motor vehicle; adjusting the vocabulary of words used by the speech-based communication system to engage the occupant within the interior environment of the motor vehicle; adjusting the quantity of words used by the speech-based communication system to engage the occupant within the interior environment of the motor vehicle; adjusting the inflection of words used by the speech-based communication system to engage the occupant within the interior environment of the motor vehicle; and adjusting the timbre of words used by the speech-based communication system to engage the occupant within the interior environment of the motor vehicle.

In another implementation, a computing system includes a processor and memory is configured to perform operations including monitoring an interior environment of a motor vehicle; determining a personal state of an occupant within the interior environment of the motor vehicle; and interacting with the occupant based, at least in part, upon the personal state of the occupant.

One or more of the following features may be included. The occupant may be a driver of the motor vehicle. The personal state of the occupant within the interior environment of the motor vehicle may include one or more of: a physiological/physical/external state of the occupant within the interior environment of the motor vehicle; and a mental/emotional/internal state of the occupant within the interior environment of the motor vehicle. Interacting with the occupant based, at least in part, upon the personal state of the occupant may include physically altering the interior environment of the motor vehicle. Physically altering the interior environment of the motor vehicle may include one or more of: adjusting a temperature of the interior environment of the motor vehicle; adjusting one or more windows of the motor vehicle; adjusting a moon roof of the motor vehicle; adjusting one or more interior lights of the motor vehicle; adjusting an entertainment system of the motor vehicle; adjusting a seating system of the motor vehicle; and adjusting a ventilation system of the motor vehicle. Interacting with the occupant based, at least in part, upon the personal state of the occupant may include one or more of: triggering an audible alarm; triggering a visual alarm; physically engaging the occupant within the interior environment of the motor vehicle; visually engaging the occupant within the interior environment of the motor vehicle; and audibly engaging the occupant within the interior environment of the motor vehicle. Interacting with the occupant based, at least in part, upon the personal state of the occupant may include adjusting the manner in which a speech-based communication system engages the occupant within the interior environment of the motor vehicle. Adjusting the manner in which a speech-based communication system engages the occupant within the interior environment of the motor vehicle may include one or more of: adjusting the tempo of words used by the speech-based communication system to engage the occupant within the interior environment of the motor vehicle; adjusting the vocabulary of words used by the speech-based communication system to engage the occupant within the interior environment of the motor vehicle; adjusting the quantity of words used by the speech-based communication system to engage the occupant within the interior environment of the motor vehicle; adjusting the inflection of words used by the speech-based communication system to engage the occupant within the interior environment of the motor vehicle; and adjusting the timbre of words used by the speech-based communication system to engage the occupant within the interior environment of the motor vehicle.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
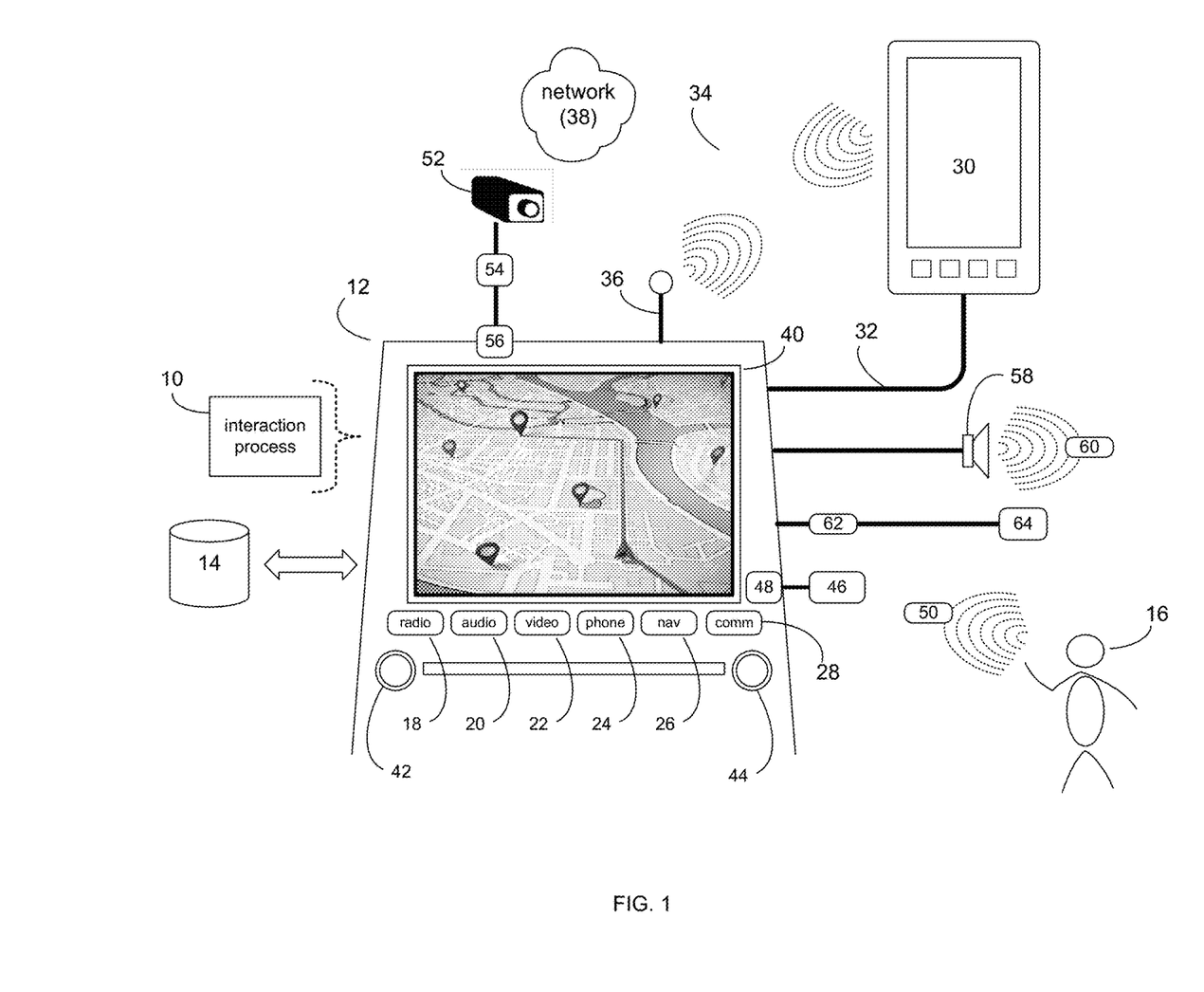
FIG. 1 is a diagrammatic view of a consumer electronic device that executes an interaction process according to an embodiment of the present disclosure.

Referring to FIG. 1, there is shown interaction process 10. Interaction process 10 may reside on and may be executed by consumer electronic device 12. Examples of consumer electronic device 12 may include but are not limited to a vehicle electronic system. Examples of such a vehicle electronic system may include any of the types of infotainment/electronic systems that are incorporated into motor vehicles, such as vehicle navigation systems, vehicle music systems, vehicle video systems, vehicle phone systems, vehicle climate control systems and vehicle control systems.

The instruction sets and subroutines of interaction process 10, which may be stored on storage device 14 coupled to consumer electronic device 12, may be executed by one or more processors (not shown) and one or more memory architectures (not shown) included within consumer electronic device 12. Examples of storage device 14 may include but are not limited to: a hard disk drive; a random access memory (RAM); a read-only memory (ROM); and all forms of flash memory storage devices. Consumer electronic device 12 may execute an operating system, examples of which may include but are not limited to Microsoft Windows™, Android™, iOS™, Linux™, or a custom operating system.

When configured as a vehicle infotainment system, consumer electronic device 12 may be configured to execute various different functionalities that may be of interest/useful to a user (e.g., user 16). Examples of such functionalities may include but are not limited to: radio functionality (e.g., that enables the playing of terrestrial radio stations and satellite radio stations); audio functionality (e.g., that enables the playing of audio, wherein this audio may be disc-based or locally stored on storage device 14); video functionality (e.g., that enables the playing of video, wherein this video may be disc-based or locally stored on storage device 14); phone functionality (e.g., that enables the placing and receiving of phone calls); navigation functionality (e.g., that enables the execution of navigation/guidance functionality); and communication functionality (e.g., that enables the sending and receiving of email/text messages/instant messages).

When configured as a vehicle infotainment system, consumer electronic device 12 may include a plurality of buttons (e.g., physical buttons or electronic buttons) that enable the selection of the above-described functionality. For example, the above-described radio functionality may be selectable via "radio" button 18; the above-described audio functionality may be selectable via "audio" button 20; the above-described video functionality may be selectable via "video" button 22; the above-described phone functionality may be selectable via "phone" button 24; the above-described navigation functionality may be selectable via "nav" button 26; and the above-described communications functionality may be selectable via "comm" button 28.

When configured as a vehicle infotainment system, consumer electronic device 12 may be configured to interface with one or more external systems (e.g., external system 30). Examples of external system 30 may include but are not limited to: a cellular telephone; a smart phone; a tablet computing device; a portable computing device; and a handheld entertainment device (e.g., such as a gaming device). When interfacing with consumer electronic device 12, external system 30 may be releasably coupled to consumer electronic device 12 via a hardwired connection (e.g., USB cable 32). Alternatively, external system 30 may be wirelessly coupled to consumer electronic device 12 via wireless communication channel 34 established between external system 30 and antenna 36 of consumer electronic device 12. An example of wireless communication channel 34 may include but is not limited to a Bluetooth communication channel. As is known in the art, Bluetooth is a telecommunications industry specification that allows e.g., mobile phones, computers, and personal digital assistants to be interconnected using a short-range wireless connection.

Consumer electronic device 12 and/or external system 30 may be configured to be wirelessly coupled to/access an external network (e.g., network 38). Examples of network 38 may include but are not limited to the internet, a cellular network, a WiFi network, and/or a cloud-based computing platform.

As discussed above, consumer electronic device 12 may be configured to execute various different functionalities that may be of interest/useful for a user (e.g., user 16). Some of these functionalities may be locally resident on (provided by) consumer electronic device 12. Additionally/alternatively, some of these functionalities may be remotely resident on (provided by) external system 30. Examples of such remotely-resident functionalities may include phone functionality (e.g., that enables the placing and receiving of phone calls via consumer electronic device 12 using external system 30) and communication functional (that enables user 16 to send/receive email, send/receive text messages and/or send/receive instant messages) via consumer electronic device 12 using external system 30. Consumer electronic device 12 may also include display screen 40 and one or more knobs/dials 42, 44 that effectuate the use of such functionalities.

Consumer electronic device 12 may include microphone assembly 46 and speech processing system 48 (such as those available from Nuance Communications, Inc. of Burlington, Mass.). Accordingly, consumer electronic device 12 may be configured to accept verbal commands (e.g., verbal command 50) that are spoken and provided by (in this example) user 16. These verbal commands (e.g., verbal command 50) may be configured to allow user 16 to access and control the above-described functionalities in a hands-free fashion. Consumer electronic device 12 may further include camera assembly 52 that may be configured to capture imagery 54 of (in this example) user 16, wherein captured video 54 may be processed by video processing system 56. Consumer electronic device 12 may further include speaker assembly 58 that may be configured to render audio 60 for (in this example) user 16, wherein audio 60 may be generated by consumer electronic device 12 and/or external system 30.

As discussed above, interaction process 10 may reside on and may be executed by consumer electronic device 12, examples of which may include but are not limited to a vehicle electronic system. For example and referring also to FIGS. 2-3, consumer electronic device 12 may be positioned within (or apportion of) motor vehicle 100, wherein vehicle 100 may include one or more occupants. For this particular example, vehicle 100 is shown to include two occupants, namely user 16 (who is driving vehicle 100) and passenger 102.

Interaction Process

Figure 2:
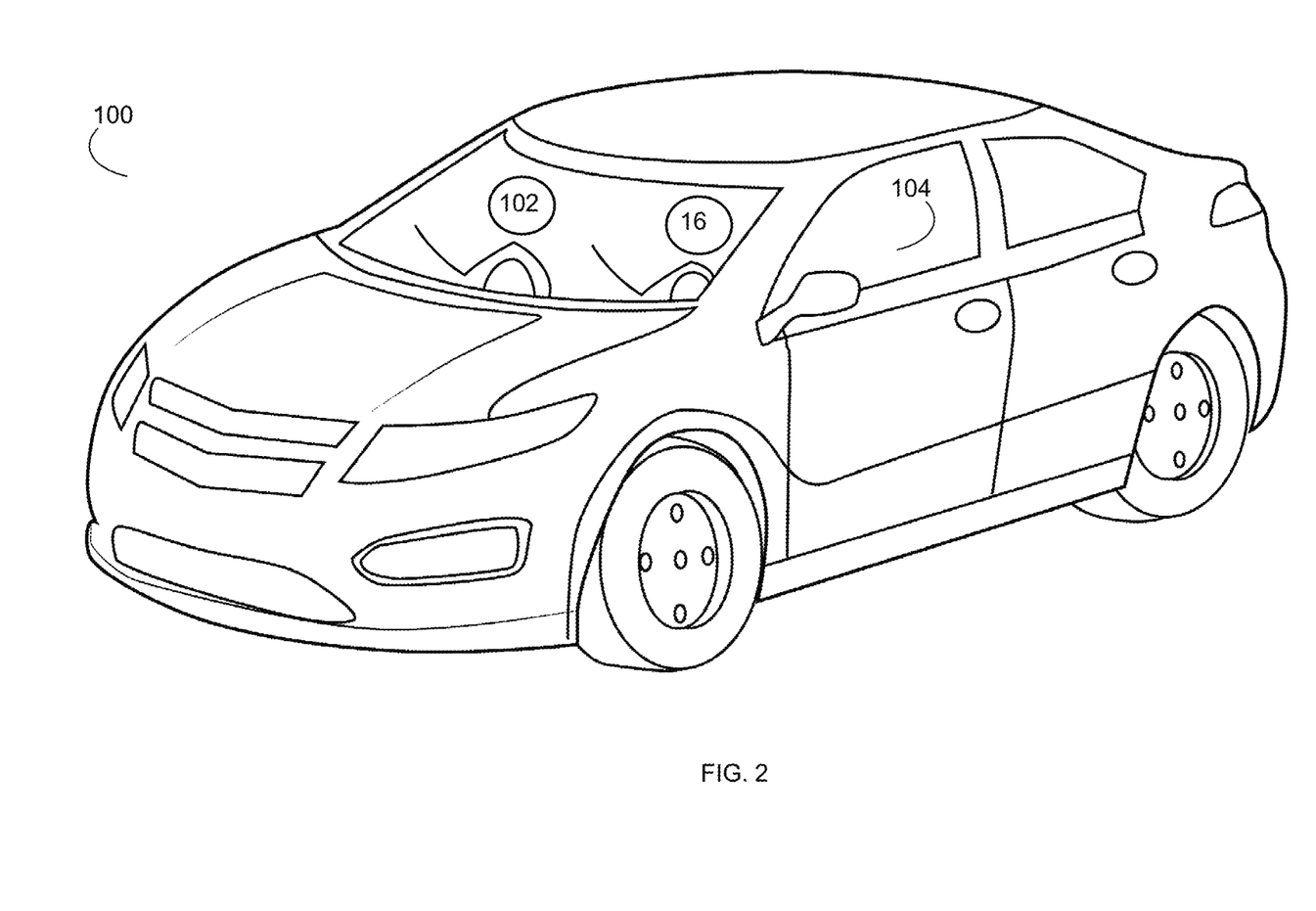
FIG. 2 is a diagrammatic view of a motor vehicle incorporating a consumer electronic device that executes the interaction process of FIG. 1.
Figure 3:
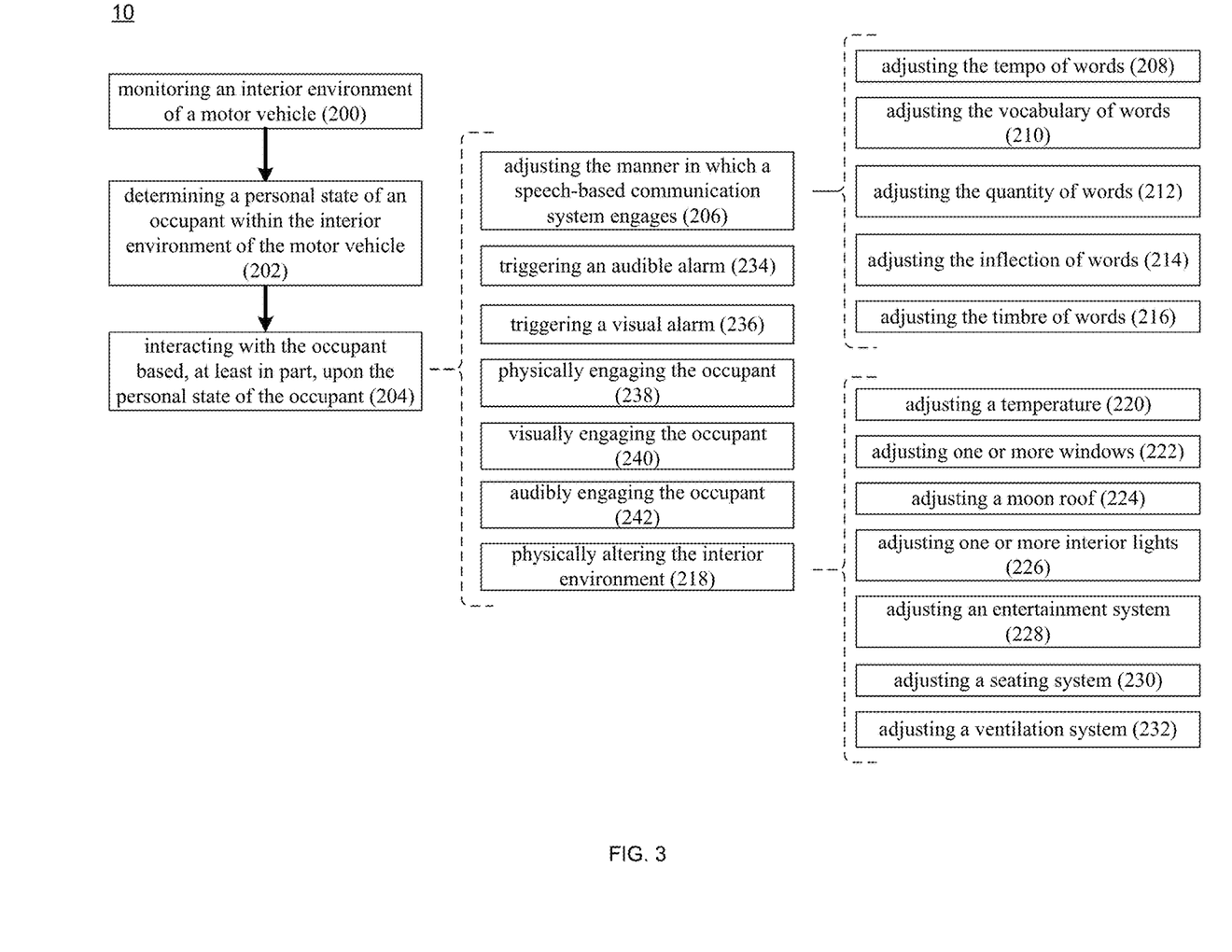
FIG. 3 is a flowchart of the interaction process of FIG. 1 according to an embodiment of the present disclosure.

Interaction process 10 may monitor 200 interior environment 104 (e.g., the passage compartment) of motor vehicle 100 and may determine 202 a personal state of an occupant (e.g., user 16 or passenger 102) within interior environment 104 of motor vehicle 100. Upon determining 202 this personal state, interaction process 10 may interact 204 with the occupant (e.g., user 16 or passenger 102) based, at least in part, upon the personal state of the occupant (e.g., user 16 or passenger 102).

Examples of the personal state determined 202 for the occupant (e.g., user 16 or passenger 102) within interior environment 104 of motor vehicle 100 may include but are not limited to one or more of:
- A physiological/physical/external state of the occupant (e.g., user 16 or passenger 102) within interior environment 104 of motor vehicle 100. For example, is the occupant (e.g., user 16 or passenger 102) hurried? Is the occupant (e.g., user 16 or passenger 102) sleepy? Is the occupant (e.g., user 16 or passenger 102) impaired? Is the occupant (e.g., user 16 or passenger 102) injured? Is the occupant (e.g., user 16 or passenger 102) sick? Is the occupant (e.g., user 16 or passenger 102) suffering a medical emergency?
- A mental/emotional/internal state of the occupant (e.g., user 16 or passenger 102) within interior environment 104 of motor vehicle 100. For example, is the occupant (e.g., user 16 or passenger 102) stressed? Is the occupant (e.g., user 16 or passenger 102) angry? Is the occupant (e.g., user 16 or passenger 102) happy? Is the occupant (e.g., user 16 or passenger 102) talkative?

Additionally, interaction process 10 may determine 202 the personal state (e.g., the physiological/physical/external state, the mental/emotional/internal state) of the occupant (e.g., user 16 or passenger 102) within interior environment 104 of motor vehicle 100 using various methodologies.

Audio Indication of Personal State

Accordingly, interaction process 10 may utilize microphone assembly 46 and speech processing system 48 to monitor the words/phrases spoken by the occupant (e.g., user 16 or passenger 102) of motor vehicle 100 to determine 202 the personal state (e.g., the physiological/physical/external state, the mental/emotional/internal state) of the occupant (e.g., user 16 or passenger 102).

For example:
- If the occupant (e.g., user 16 or passenger 102) is speaking more quickly, this may be indicative of the occupant (e.g., user 16 or passenger 102) being rushed/hurried/alert.
- If the occupant (e.g., user 16 or passenger 102) is speaking at a normal pace, this may be indicative of the occupant (e.g., user 16 or passenger 102) being relaxed/calm.

If the occupant (e.g., user 16 or passenger 102) is speaking more slowly, this may be indicative of the occupant (e.g., user 16 or passenger 102) being sleepy/tired.

If the occupant (e.g., user 16 or passenger 102) is snoring/silent, this may be indicative of the occupant (e.g., user 16 or passenger 102) being asleep.

If the occupant (e.g., user 16 or passenger 102) is speaking loudly/shouting, this may be indicative of the occupant (e.g., user 16 or passenger 102) being annoyed/stressed.

If the occupant (e.g., user 16 or passenger 102) is being verbose, this may be indicative of the occupant (e.g., user 16 or passenger 102) being happy/talkative.

If the occupant (e.g., user 16 or passenger 102) is slurring their speech, this may be indicative of the occupant (e.g., user 16 or passenger 102) being impaired.

If the occupant (e.g., user 16 or passenger 102) is using a lot of upward inflexion, this may be indicative of the occupant (e.g., user 16 or passenger 102) being unsure/confused.

Video Indication of Personal State

Further, interaction process 10 may utilize camera assembly 52 and video processing system 56 to visually monitor the occupant (e.g., user 16 or passenger 102) of motor vehicle 100 to determine 202 the personal state (e.g., the physiological/physical/external state, the mental/emotional/internal state).

For example:

If the occupant (e.g., user 16 or passenger 102) has an overly alert facial expression (e.g., fully-opened eyes, animated head movements), this may be indicative of the occupant (e.g., user 16 or passenger 102) being rushed/hurried/alert.

If the occupant (e.g., user 16 or passenger 102) has a normal facial expression (e.g., normally-opened eyes, typical head movements), this may be indicative of the occupant (e.g., user 16 or passenger 102) being relaxed/calm.

If the occupant (e.g., user 16 or passenger 102) has a tired facial expression (e.g., partially-closed eyes, bobbing head movements), this may be indicative of the occupant (e.g., user 16 or passenger 102) being sleepy/tired.

If the occupant (e.g., user 16 or passenger 102) has a sleeping facial expression (e.g., fully-closed eyes, tilted/canted head), this may be indicative of the occupant (e.g., user 16 or passenger 102) being asleep.

If the occupant (e.g., user 16 or passenger 102) has an anxious facial expression (e.g., furloughed brow, canted eyebrows, jerking head movements), this may be indicative of the occupant (e.g., user 16 or passenger 102) being annoyed/stressed.

If the occupant (e.g., user 16 or passenger 102) has a happy facial expression (e.g., smiling, with bouncy head movements), this may be indicative of the occupant (e.g., user 16 or passenger 102) being happy/talkative.

If the occupant (e.g., user 16 or passenger 102) has an impaired facial expression (e.g., partial closed eyes, dilated pupils), this may be indicative of the occupant (e.g., user 16 or passenger 102) being impaired.

If the occupant (e.g., user 16 or passenger 102) has a confused facial expression (e.g., differently opened eyes, tilted head), this may be indicative of the occupant (e.g., user 16 or passenger 102) being unsure/confused.

As discussed above, interaction process 10 may utilize audio information and/or video information to determine 202 the personal state (e.g., the physiological/physical/external state, the mental/emotional/internal state) of the occupant (e.g., user 16 or passenger 102) of motor vehicle 100. Once this personal state (e.g., the physiological/physical/external state, the mental/emotional/internal state) is determined 202, interaction process 10 may interact 204 with the occupant (e.g., user 16 or passenger 102) based, at least in part, upon the personal state of the occupant (e.g., user 16 or passenger 102).

When interacting 204 with the occupant (e.g., user 16 or passenger 102) based, at least in part, upon the personal state (e.g., the physiological/physical/external state, the mental/emotional/internal state) of the occupant (e.g., user 16 or passenger 102), interaction process 10 may perform various functions, an example of which may include but is not limited to adjusting 206 the manner in which a speech-based communication system (e.g., speech processing system 48) engages the occupant (e.g., user 16 or passenger 102) within interior environment 104 of motor vehicle 100.

When adjusting 206 the manner in which a speech-based communication system (e.g., speech processing system 48) engages the occupant (e.g., user 16 or passenger 102) within interior environment 104 of motor vehicle 100, interaction process 10 may tailor the interaction with the occupant (e.g., user 16 or passenger 102) to adapt to or influence the personal state (e.g., the physiological/physical/external state, the mental/emotional/internal state) of the occupant (e.g., user 16 or passenger 102).

For example:

Interaction process 10 may adjust 208 the tempo of words used by the speech-based communication system (e.g., speech processing system 48) to engage the occupant (e.g., user 16 or passenger 102) within interior environment 104 of motor vehicle 100. For example, if the personal state of the occupant (e.g., user 16 or passenger 102) within interior environment 104 of motor vehicle 100 indicates that they are rushed, a quicker tempo may be used. Conversely, if the personal state of the occupant (e.g., user 16 or passenger 102) within interior environment 104 of motor vehicle 100 indicates that they are relaxed, a slower tempo may be used.

Interaction process 10 may adjust 210 the vocabulary of words used by the speech-based communication system (e.g., speech processing system 48) to engage the occupant (e.g., user 16 or passenger 102) within interior environment 104 of motor vehicle 100. For example, if the personal state of the occupant (e.g., user 16 or passenger 102) within interior environment 104 of motor vehicle 100 indicates that they are stressed, a more formal or neutral vocabulary of words may be used. Conversely, if the personal state of the occupant (e.g., user 16 or passenger 102) within interior environment 104 of motor vehicle 100 indicates that they are relaxed, a more informal or colloquial vocabulary of words may be used.

Interaction process 10 may adjust 212 the quantity of words used by the speech-based communication system (e.g., speech processing system 48) to engage the occupant (e.g., user 16 or passenger 102) within interior environment 104 of motor vehicle 100. For example, if the personal state of the occupant (e.g., user 16 or passenger 102) within interior environment 104 of motor vehicle 100 indicates that they are rushed, fewer words/shorter sentences may be used. Conversely, if the personal state of the occupant (e.g., user 16 or passenger 102) within interior environment 104 of motor vehicle 100 indicates that they are talkative, more words/longer sentences may be used.

Interaction process 10 may adjust 214 the inflection of words used by the speech-based communication system (e.g., speech processing system 48) to engage the occupant (e.g., user 16 or passenger 102) within interior environment 104 of motor vehicle 100. For example, if the personal state of the occupant (e.g., user 16 or passenger 102) within interior environment 104 of motor vehicle 100 indicates that they are annoyed, a more monotonous/calming inflection may be used. Conversely, if the personal state of the occupant (e.g., user 16 or passenger 102) within interior environment 104 of motor vehicle 100 indicates that they are happy, a more varied/lively inflection may be used.

Interaction process 10 may adjust 216 the timbre of words used by the speech-based communication system (e.g., speech processing system 48) to engage the occupant (e.g., user 16 or passenger 102) within interior environment 104 of motor vehicle 100. For example, if the personal state of the occupant (e.g., user 16 or passenger 102) within interior environment 104 of motor vehicle 100 indicates that they are happy, words spoken in a bright and tensed timbre may be used. Conversely, if the personal state of the occupant (e.g., user 16 or passenger 102) within interior environment 104 of motor vehicle 100 indicates that they are sad, words spoken in a somber and breathy timbre may be used.

As discussed above, when interacting 204 with the occupant (e.g., user 16 or passenger 102) based, at least in part, upon the personal state (e.g., the physiological/physical/external state, the mental/emotional/internal state) of the occupant (e.g., user 16 or passenger 102), interaction process 10 may perform various functions, another example of which may include but is not limited to physically altering 218 interior environment 104 of motor vehicle 100.

For example and in the event that it is determined that the occupant (e.g., user 16) who is driving motor vehicle 100 appears to be impaired and/or sleepy, interaction process 10 may take remedial action and may physically alter 218 interior environment 104 of motor vehicle 100 in an attempt to make the occupant (e.g., user 16) more alert. One or more of the below-described remedial actions may be: a) automatically initiated by interaction process 10; or b) offered to the occupant (e.g., user 16) by interaction process 10 and only initiated if approved by the occupant (e.g., user 16).

For example:

Interaction process 10 may adjust 220 the temperature of interior environment 104 of motor vehicle 100. For example, in the event that the occupant (e.g., user 16) appears to be impaired and/or sleepy, interaction process 10 may provide control signal 62 to interface system 64, wherein interface system 64 may be configured to interact with the climate control system (not shown) of motor vehicle 100 so that e.g., the temperature within interior environment 104 may be reduced in an attempt to heighten the level of alertness of the occupant (e.g., user 16).

Interaction process 10 may adjust 222 one or more windows of motor vehicle 100. For example, in the event that the occupant (e.g., user 16) appears to be impaired and/or sleepy, interaction process 10 may provide control signal 62 to interface system 64, wherein interface system 64 may be configured to interact with the window control system (not shown) of motor vehicle 100 so that e.g., one or more windows (not shown) of motor vehicle 100 may be lowered in an attempt to heighten the level of alertness of the occupant (e.g., user 16).

Interaction process 10 may adjust 224 a moon roof of motor vehicle 100. For example, in the event that the occupant (e.g., user 16) appears to be impaired and/or sleepy, interaction process 10 may provide control signal 62 to interface system 64, wherein interface system 64 may be configured to interact with the moon roof control system (not shown) of motor vehicle 100 so that e.g., the moon roof (not shown) of motor vehicle 100 may be opened in an attempt to heighten the level of alertness of the occupant (e.g., user 16).

Interaction process 10 may adjust 226 one or more interior lights of motor vehicle 100. For example, in the event that the occupant (e.g., user 16) appears to be impaired and/or sleepy, interaction process 10 may provide control signal 62 to interface system 64, wherein interface system 64 may be configured to interact with the lighting control system (not shown) so that e.g., the interior environment 104 may be brightened in an attempt to heighten the level of alertness of the occupant (e.g., user 16).

Interaction process 10 may adjust 228 an entertainment system of motor vehicle 100. For example, in the event that the occupant (e.g., user 16) appears to be impaired and/or sleepy, interaction process 10 may provide control signal 62 to interface system 64, wherein interface system 64 may be configured to interact with the entertainment system (e.g., consumer electronic device 12) within motor vehicle 100 so that e.g., loud music may be played. Alternatively, a type of music (e.g., classical/rock/heavy metal) that the occupant (e.g., user 16) finds energizing (based upon personal preferences) may be played. Alternatively still, the occupant (e.g., user 16) of motor vehicle 100 may be required to engage in a synthetic conversation (e.g., interaction process 10 and the occupant (e.g., user 16) may engage in a conversation involving speech recognition, natural language understanding (NLU), dialog management, natural language generation (NLG), and speech synthesis) in an attempt to heighten the level of alertness of the occupant (e.g., user 16).

Interaction process 10 may adjust 230 a seating system of motor vehicle 100. For example, in the event that the occupant (e.g., user 16) appears to be impaired and/or sleepy, interaction process 10 may provide control signal 62 to interface system 64, wherein interface system 64 may be configured to interact with the seating system (not shown) of motor vehicle 100 so that e.g., the driver's seat may be adjusted to e.g., place the occupant (e.g., user 16) in a more upright driving position in an attempt to heighten the level of alertness of the occupant (e.g., user 16). In order for interaction process 10 to be configured in such a fashion, proactive approval by the occupant (e.g., user 16) may be required due to the intrusive nature of such an interaction.

Interaction process 10 may adjust 232 a ventilation system of motor vehicle 100. For example, in the event that the occupant (e.g., user 16) appears to be impaired and/or sleepy, interaction process 10 may provide control signal 62 to interface system 64, wherein interface system 64 may be configured to interact with the ventilation system (not shown) of motor vehicle 100 so that e.g., high velocity air may be directed toward the occupant (e.g., user 16) in an attempt to heighten the level of alertness of the occupant (e.g., user 16).

Again and as discussed above, when interacting 204 with the occupant (e.g., user 16 or passenger 102) based, at least in part, upon the personal state (e.g., the physiological/physical/external state, the mental/emotional/internal state) of the occupant (e.g., user 16 or passenger 102), interaction process 10 may perform various functions. One or more of the below-described functions may be: a) automatically initiated by interaction process 10; or b) offered to the occupant (e.g., user 16) by interaction process 10 and only initiated if approved by the occupant (e.g., user 16). Examples of such functions may include but is not limited to:

Interaction process 10 triggering 234 an audible alarm. For example, in the event that the occupant (e.g., user 16) appears to be impaired and/or sleepy, interaction process 10 may render an audible alarm (via speaker assembly 58) in an attempt to heighten the level of alertness of the occupant (e.g., user 16).

Interaction process 10 triggering 236 a visual alarm. For example, in the event that the occupant (e.g., user 16) appears to be impaired and/or sleepy, interaction process 10 may render a visual alarm (via display screen 40 and/or an interior lightening system (not shown)) in an attempt to heighten the level of alertness of the occupant (e.g., user 16).

Interaction process 10 physically engaging 238 the occupant (e.g., user 16) within interior environment 104 of motor vehicle 100. For example, in the event that the occupant (e.g., user 16) appears to be impaired and/or sleepy, interaction process 10 may physically engage the occupant (e.g., user 16) via e.g., vibratory motors in the steering wheel (not shown), vibratory motors in the seat (not shown) and/or a water misting assembly (not shown) in an attempt to heighten the level of alertness of the occupant (e.g., user 16). In order for interaction process 10 to be configured in such a fashion, proactive approval by the occupant (e.g., user 16) may be required due to the intrusive nature of such an interaction.

Interaction process 10 visually engaging 240 the occupant (e.g., user 16) within interior environment 104 of motor vehicle 100. For example, in the event that the occupant (e.g., user 16) appears to be impaired and/or sleepy, interaction process 10 may visually engage the occupant (e.g., user 16) via e.g., display screen 40 in an attempt to heighten the level of alertness of the occupant (e.g., user 16), wherein the occupant (e.g., user 16) may be required to touch display screen 40 at defined interval in order to avoid the triggering on an alarm. In order for interaction process 10 to be configured in such a fashion, proactive approval by the occupant (e.g., user 16) may be required due to the intrusive nature of such an interaction.

Interaction process 10 audibly engaging 242 the occupant (e.g., user 16) within interior environment 104 of motor vehicle 100. For example, in the event that the occupant (e.g., user 16) appears to be impaired and/or sleepy, interaction process 10 may audibly engage the occupant (e.g., user 16) via e.g., speaker assembly 58 and microphone assembly 48 in an attempt to heighten the level of alertness of the occupant (e.g., user 16), wherein the occupant (e.g., user 16) may utilize the speech-based communication system (e.g., speech processing system 48) to engage the occupant (e.g., user 16) in a synthetic conversation (e.g., interaction process 10 and the occupant (e.g., user 16) may engage in a conversation involving speech recognition, natural language understanding (NLU), dialog management, natural language generation (NLG), and speech synthesis) to avoid the triggering on an alarm.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device, said method comprising: using an infotainment system having a microphone and a video camera to monitor an interior environment of a motor vehicle; based on information provided by said microphone and said video camera, determining a personal state of an occupant within the interior environment of the motor vehicle; and, interacting with the occupant based at least in part on the personal state of the occupant, wherein using the infotainment system comprises monitoring the interior environment with the video camera and the microphone, wherein interacting with the occupant based, at least in part on the personal state of the occupant comprises adjusting the manner in which a speech-processing system engages the occupant within the interior environment of the motor vehicle, and wherein the speech-processing system is configured to both understand and generate natural language and to synthesize speech.

2. The computer-implemented method of claim 1, wherein interacting with the occupant based, at least in part, upon the personal state of the occupant comprises adjusting one or more windows of the motor vehicle.

3. The computer-implemented method of claim 1, wherein interacting with the occupant based at least in part upon the personal state of the occupant includes adjusting the tempo of words used by the speech-processing system to engage the occupant within the interior environment of the motor vehicle, wherein the extent of the adjustment depends on the personal state, and wherein adjusting the tempo comprises using a quicker tempo upon detecting that personal state is one of being rushed and using a relaxed and slower tempo upon determining that the personal state is one of relaxation.

4. The manufacture of claim 1, wherein interacting with the occupant based, at least in part, upon the personal state of the occupant comprises adjusting a moon roof of the motor vehicle.

5. The computer-implemented method of claim 1, wherein interacting with the occupant based at least in part on the personal state of the occupant includes adjusting the vocabulary of words used by a speech-based communication system to engage the occupant within the interior environment of the motor vehicle, wherein the vocabulary is adjusted based at least in part on the personal state of the occupant, wherein adjusting the vocabulary comprises selecting a formal vocabulary in response to determining that the personal state is one of being stressed and selecting an informal vocabulary upon detecting that the personal state is one of being relaxed.

6. The computer-implemented method of claim 1, wherein interacting with the occupant based at least in part on the personal state of the occupant includes adjusting the quantity of words used by the speech-processing system to engage the occupant within the interior environment of the motor vehicle, wherein adjusting the quantity comprises using fewer words and shorter sentences upon detecting that the personal state is that of being rushed and using more words and longer sentences upon detecting that the personal state is that of being talkative.

7. The computer-implemented method of claim 1, wherein interacting with the occupant based at least in part on the personal state of the occupant includes adjusting the inflection of words used by the speech-processing system that is communicating with the occupant, wherein adjusting the inflection comprises selecting a monotonous and calming inflection upon detecting that the personal state of the occupant is one of being annoyed and selecting a varied and lively inflection upon determining that the personal state of the occupant is one of happiness.

8. The computer-implemented method of claim 1, wherein interacting with the occupant based at least in part on the personal state of the occupant includes adjusting the timbre of words used by the speech-processing system, wherein adjusting the timbre comprises using words spoken in a in a bright and tensed timbre upon determining that the personal state of the occupant is one of happiness and using a somber and breathy timbre upon determining that the personal state of the occupant is one of sadness.

9. The computer-implemented method of claim 1, wherein monitoring an interior environment of a motor vehicle comprises using the microphone to provide speech from said occupant to a speech-processing system that is configured for natural-language understanding.

10. The computer-implemented method of claim 1, wherein interacting with the occupant comprises lowering a window of the motor vehicle.

11. The computer-implemented method of claim 1, wherein interacting with the occupant comprises requiring the occupant to engage in a synthetic conversation, wherein said personal state is a mental state.

12. The computer-implemented method of claim 1, wherein interacting with the occupant comprises adjusting an interior light of said motor vehicle and brightening the interior environment of the vehicle, wherein said personal state is a mental state.

13. The computer-implemented method of claim 1, wherein interacting with the occupant based at least in part on the personal state of the occupant comprises adjusting seating in said motor vehicle, wherein said personal state is a mental state.

14. The computer-implemented method of claim 1, wherein interacting with the occupant comprises requiring that a display screen be touched at defined intervals to avoid triggering an alarm in said motor vehicle, wherein said personal state is a mental state.

15. The computer-implemented method of claim 1, wherein interacting with the occupant based at least in part on the personal state of the occupant comprises placing the occupant in a more upright driving position.

16. The method of claim 1, wherein determining the personal state comprises inferring that the personal state is that of being rushed, hurried, and alert based on having determined that the occupant is speaking more quickly than a normal pace, inferring that the personal state is that of being relaxed and calm based upon having determined that the occupant is speaking at the normal pace, inferring that the personal state is that of being s sleepy and tired based upon having determined that the occupant is speaking more slowly than normal, inferring that the personal state is that of stress and annoyance based upon having determined that the occupant is shouting, inferring that the personal state is that of being happy based upon having determined that the occupant is being verbose, inferring that the personal state is that of being impaired based upon having determined that the occupant is speaking with slurred speech, and inferring that the personal state is that of being unsure and confused based upon having determined that the occupant is speaking with upward inflection.

17. A manufacture comprising a tangible and non-transitory computer-readable medium having, encoded thereon, instructions that, when executed by a processor, cause the processor to perform operations comprising: using an infotainment system having a microphone, a speech-processing system, and a video camera to monitor an interior environment of a motor vehicle; determining a personal state of an occupant within the interior environment of the motor vehicle; and, using the speech-processing system, interacting with the occupant based, at least in part, upon the personal state of the occupant, wherein using the infotainment system comprising monitoring the interior environment with the video camera and the microphone, wherein interacting with the occupant based, at least in part, upon the personal state of the occupant includes: adjusting the manner in which the speech-processing system engages the occupant within the interior environment of the motor vehicle based on the personal state of the occupant, wherein the speech-processing system is configured to both understand and generate natural language and to synthesize speech.

18. The manufacture of claim 17, wherein adjusting the manner in which the speech-processing system engages the occupant within the interior environment of the motor vehicle includes adjusting the tempo of words used by the speech-processing system to engage the occupant within the interior environment of the motor vehicle; adjusting the vocabulary of words used by the speech-processing system to engage the occupant within the interior environment of the motor vehicle; adjusting the quantity of words used by the speech-processing system to engage the occupant within the interior environment of the motor vehicle; adjusting the inflection of words used by the speech-processing system to engage the occupant within the interior environment of the motor vehicle; and adjusting the timbre of words used by the speech-processing system to engage the occupant within the interior environment of the motor vehicle.

19. The apparatus of claim 17, wherein adjusting the manner in which the speech-processing system engages the occupant within the interior environment of the motor vehicle includes one or more of: adjusting the tempo of words used by the speech-processing system to engage the occupant within the interior environment of the motor vehicle; adjusting the vocabulary of words used by the speech-processing system to engage the occupant within the interior environment of the motor vehicle; adjusting the quantity of words used by the speech-processing system to engage the occupant within the interior environment of the motor vehicle; adjusting the inflection of words used by the speech-processing system to engage the occupant within the interior environment of the motor vehicle; and adjusting the timbre of words used by the speech-processing system to engage the occupant within the interior environment of the motor vehicle.

20. An apparatus configured to monitor a motor vehicle's interior environment, said apparatus comprising an infotainment system in the motor vehicle, wherein the infotainment system comprises a processor, a memory, a microphone, a video camera, and a speech-processing system for interacting with the occupant, and a speech-processing system, the microphone and the video camera being disposed to monitor the motor vehicle's interior environment wherein the speech-processing system is configured to both understand and generate natural language and to synthesize speech, and wherein the speech-processing system is configured to adjust the manner in which the speech-based communication system engages the occupant within the interior environment of the motor vehicle.

21. The apparatus of claim 20, wherein the infotainment system is configured to be wirelessly coupled to a cloud-based computing platform.

22. The apparatus of claim 20, wherein the infotainment system is configured to play terrestrial radio stations and satellite radio stations, to play disc-based stored audio, to play stored video, to place and receive telephone calls, to provide navigation information, and to send and receive messages, said messages including email messages, text messages and instant messages and wherein the infotainment system is further configured to interface with an external system.

23. The apparatus of claim 20, wherein the infotainment system is configured to interface with a cellular telephone; a smart phone; a tablet computing device; and a portable computing device.

* * * * *